W. ADAMS.
Adjustable Shaft and Pole Attachments for Vehicles.

No. 156,747. Patented Nov. 10, 1874.

Witnesses.
N. C. Lombard
B. Andrews

Inventor
William Adams

UNITED STATES PATENT OFFICE.

WILLIAM ADAMS, OF ROCKLAND, MAINE.

IMPROVEMENT IN ADJUSTABLE SHAFT AND POLE ATTACHMENTS FOR VEHICLES.

Specification forming part of Letters Patent No. 156,747, dated November 10, 1874; application filed August 14, 1874.

*To all whom it may concern:*

Be it known that I, WILLIAM ADAMS, of Rockland, in the county of Knox and State of Maine, have invented certain new and useful Improvements in Adjustable Shaft and Pole Attachments for Carriages and Sleighs, of which the following, taken in connection with the accompanying drawings, is a specification:

My invention relates to a supplementary shaft-coupling, attached by suitable devices to the ordinary coupling permanently attached to the axle of a carriage, or the runner of a sleigh, so as to be adjustable in relation thereto, to adapt said couplings to receive shafts of different widths, or a pole, the eyes upon which may be a greater or less width apart than the couplings on the axle; and it consists in the attachment to the ordinary coupling, secured to the axle of a carriage or runner of a sleigh, of a stand or arm provided with a fork or open slot to embrace the shaft-bolt of the fixed coupling, and ears to rest upon the body of the coupling, and a T-shaped bolt to secure said arm rigidly to the fixed coupling, the outer end of said arm being provided with an eye to receive a rod or bar, which may be adjusted endwise therein, and held in any desired position. My invention further consists in the use of a supplementary coupling, mounted upon said bar or rod in such a manner that it may be adjusted thereon and secured in any desired position upon either side of the arm which supports the rod on which said coupling is mounted. It further consists in providing said bar or rod with a series of notches or grooves, extending transversely across one of its sides or corners, in combination with a taper pin or key provided with a screw-thread to fit a corresponding thread formed in the supporting-arm, or the supplementary coupling, as will be more fully described. My invention further consists in the use of a stand, attached to the axle in such a manner that it may be adjusted toward or from the ordinary coupling secured to the axle, and provided with an oblong slot in its outer end, to receive one end of the rod or bar which supports the supplementary coupling, and also provided with a series of teeth or serrations, extending vertically across one of its faces, in combination with a collar or washer provided with a corresponding series of teeth or serrations, said collar being fitted to the end of the supporting-rod, and resting against a shoulder formed thereon, said stand and collar being held together and to the supporting-rod by means of a nut fitted to a thread formed upon the end of said rod, as will be explained.

Figure 3:
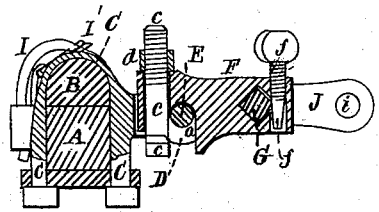
Figure 6:
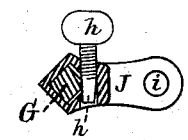
Figure 2:
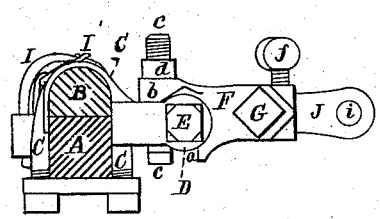
Figure 5:
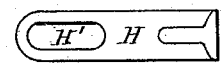
Figure 1:
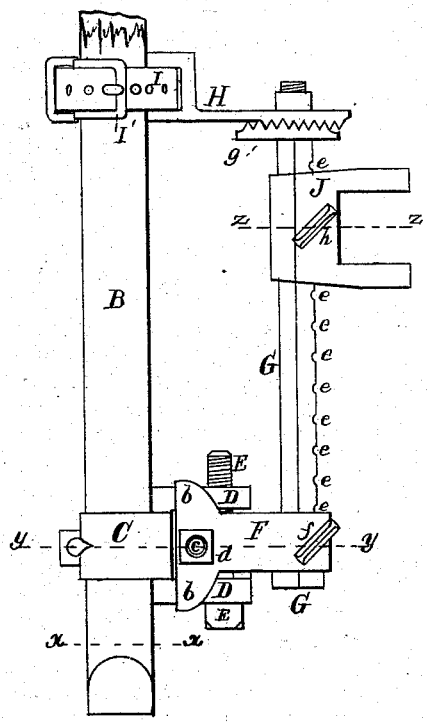
Figure 4:
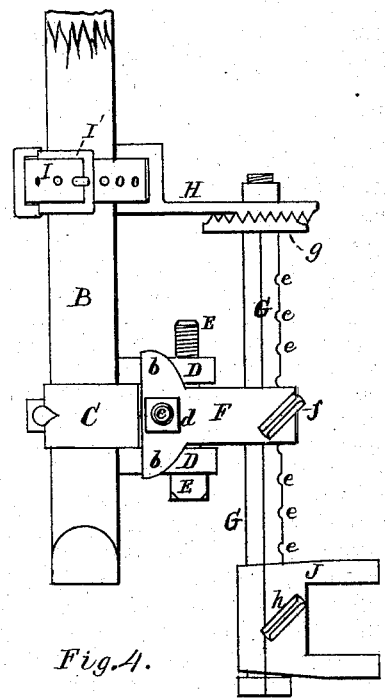

In the drawings, Figure 1 is a plan of my improved attachment, and so much of a carriage-axle as is necessary to illustrate its application. Fig. 2 is a transverse section of the axle on line $x\,x$, and showing the attachment in elevation. Fig. 3 is a transverse section through axle and attachment on line $y\,y$. Fig. 4 is a plan, showing the supplementary coupling outside of the supporting arm. Fig. 5 is an elevation of the stand for supporting the inner end of the rod upon which the supplementary coupling is mounted. Fig. 6 is a section of supplementary coupling and its supporting-bar on line $z\,z$.

A is the iron axle, and B the wooden bolster fitted thereto, the two being secured together by the clip C, upon the front side of which are formed the ears D, through which passes the bolt E, which together form the ordinary coupling for connecting the shafts of a carriage to its axle. These couplings are placed at varying distances apart by different manufacturers, and by the same manufacturers on different styles of carriages, and the couplings for poles do not correspond in width with those for shafts, and therefore it becomes necessary, if it is desired to apply a pair of shafts or a pole to a carriage or sleigh to which it was not originally fitted, to have a special coupling applied, which cannot always be done at a moment's notice, and, besides, it is expensive.

With one of my improved attachments, a party owning several carriages and sleighs can use any pair of shafts, or a single pole, with either of the carriages or sleighs, the coupling being readily adjusted to any desired width.

This is a great advantage, as it often happens that a pair of shafts are broken, and for want of another pair that will fit the couplings on the axle, the carriage has to be laid aside until the shafts are repaired; or a party may have a light single carriage and a heavy two-horse carriage, and at certain times he may desire to harness the pair of horses to the light carriage, which he is enabled to do at a moment's notice, if he is provided with my improvement, by attaching the pole of his double carriage to the light single carriage.

To accomplish this desirable end I construct a bracket or arm, F, provided with an open slot, a, and the ears b b, so formed and constructed that, while the body of the arm F fills the space between the ears D usually occupied by the eye of the shaft, the ears b b rest upon the upper sides of the ears D, and the bolt E passes through the slot a, the arm or bracket F being rigidly secured in position by means of the bolt c, made in the form of a letter T, and the nut d, the T-shaped head of the bolt bearing against the under sides of the ears D, as shown. The outer end of the bracket F is provided with an eye or hole, extending through the same parallel to the axle, to which is fitted the bar or rod G in such a manner that it may be adjusted endwise therein. This bar may be round, square, or of any other desired shape in cross-section, although I have represented the square bar as being the most desirable form. The bar G is provided with a series of notches or grooves, e e, cut transversely across one of its sides or corners, by means of which the bar may be secured in any desired position in the bracket F by inserting the taper pin or key f in the hole provided for the purpose in the bracket F, and fitting it into one of the notches e. The pin f is provided with a screw-thread upon its upper portion, to fit a corresponding thread formed in the upper part of the bracket F, as shown, as a safeguard to prevent the pin from being shaken out by the jarring of the carriage. The inner end of the bar G has fitted to it the collar g, provided upon its outer face with a series of serrations extending vertically across the same, said collar bearing against a shoulder formed for the purpose upon the bar G. H is a stand, the foot of which rests against the axle, to which it is secured by the leather strap I and buckle I', or by any other suitable device, by which it may be readily fitted to axles of different sizes, so as to be adjustable thereon. The outer end of the stand H has formed therein an oblong slot, H', through which the end of the bar G protrudes, and the inner face of said stand is provided with a series of serrations corresponding to those on the collar g, all so arranged that the length of the stand H from the face of its foot to the center of the bar G may be readily adjusted to fit or correspond to the varying length of the ears D. J is a supplementary coupling mounted upon the bar G, so as to be adjustable thereon, and secured in any desired position by means of the screw-pin h, constructed and applied in the same manner as the pin f. The coupling J is provided with the hole i, to receive the coupling-bolt for connecting the shafts or pole to said coupling in a well-known manner.

By the use of my invention any pair of shafts or a pole may be applied to any carriage or sleigh of modern construction. My invention may also be made useful upon sleighs as a "set over" in many sections of the country where it is desirable to have the horse of a single team travel in the right or left hand path of the road, any desired amount of set over being obtainable with my improvement.

What I claim as new, and desire to secure by Letters Patent of the United States, is—

1. In combination with the ordinary shaft-coupling of a carriage or sleigh, the bracket or arm F, provided with the open slot a and ears b b, and attached rigidly to said coupling by means of the bolt c as a means of supporting a supplementary coupling, substantially as described.

2. The bar G, fitted to the bracket F to be adjusted endwise therein, and secured in any desired position by means of the notches e formed therein, and the taper screw-pin f, all combined substantially as described.

3. In combination with the bracket F, rigidly attached to the ordinary shaft coupling of a carriage or sleigh, and carrying the rod or bar G, the supplementary coupling J, to be adjusted upon said bar, substantially as described.

4. The combination of the bar G, provided with the notches e e, the supplementary adjustable coupling J, and the screw taper pin h, all constructed to operate substantially as described.

5. In combination with the bar G, attached by the bracket F to the ordinary coupling D, the collar g and stand h, each provided with a series of teeth or serrations upon their contiguous faces as a means of support for the inner end of said bar and adjustment of its distance from the axle, substantially as described.

6. The combination of the bar G, bracket F, stand H, collar g, adjustable coupling J, and strap I, all constructed substantially as described, for the purpose specified.

Executed at Boston this 11th day of August, 1874.

WILLIAM ADAMS.

Witnesses:
N. C. LOMBARD,
B. ANDREWS, Jr.